(12) United States Patent
Raghunathan et al.

(10) Patent No.: US 9,589,003 B2
(45) Date of Patent: *Mar. 7, 2017

(54) SPARSE DATATABLE DATA STRUCTURE

(71) Applicant: Microsoft Technology Licensing, LLC, Redmond, WA (US)

(72) Inventors: Sudarshan Raghunathan, Cambridge, MA (US); Samuel I. Weiss, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,605

(22) Filed: Jun. 20, 2016

(65) Prior Publication Data

US 2016/0299926 A1  Oct. 13, 2016

Related U.S. Application Data

(63) Continuation of application No. 14/270,185, filed on May 5, 2014, now Pat. No. 9,372,877.

(51) Int. Cl.
*G06F 17/30* (2006.01)

(52) U.S. Cl.
CPC .. *G06F 17/30315* (2013.01); *G06F 17/30289* (2013.01); *G06F 17/30292* (2013.01); *G06F 17/30336* (2013.01)

(58) Field of Classification Search
CPC ............. G06F 17/30292; G06F 17/30336
See application file for complete search history.

(56) References Cited

PUBLICATIONS

"Sparse Arrays", Retrieved from: <<www.cis.upenn.edu/~matuszek/cit594-2004/Lectures/45-sparse-arrays.ppt>>, Feb. 28, 2014, 1 Page.
"Sparse Matrices and Their Data Structures", Retrieved from: <<http://www.staff.science.uu.nl/~bisse101/Book/PSC/psc4_2.pdf>>, Dec. 12, 2012, 20 Pages.
"Sparse Matrix Data Structures", Retrieved from <<http://web.archive.org/web/20140319074145/http://www.cs.indiana.edu/classes/p573/notes/sparsemat/sparsemat.html>>, Feb. 28, 2014, 8 Pages.
"Sparse Matrix Operations", Retrieved from <<http://www.mathworks.in/help/matlab/math/sparse-matrix-operations.html>>, Apr. 19, 2013, 11 Pages.
"Use Sparse Columns", Retrieved from: <<http://technet.microsoft.com/en-us/library/cc280604.aspx>>, Dec. 20, 2008, 7 Pages.

(Continued)

*Primary Examiner* — Grace Park
(74) *Attorney, Agent, or Firm* — Nicholas Chen; Kate Drakos; Micky Minhas

(57) ABSTRACT

A sparse dataset structure is created by creating column vectors for one or more columns in a dataset that have at least one significant value. Each column vector includes data values for columns of the dataset. Each column vector that is a sparse column vector includes a look-up index array and a value array. Entries in the look-up index array represent columns. The value array includes values for a row in a column. Each entry in the value array points to a row entry in the look-up index array. A side structure includes a row index and a column index. The row index includes a location for an entry for each row where entries point to a location in the column index that identifies a column that has a first significant entry for a row. Alternatively a sparse dataset could be constructed with sparse rows.

20 Claims, 4 Drawing Sheets

(56) References Cited

PUBLICATIONS

"Notice of Allowance Issued in U.S. Appl. No. 14/270,185", Mailed Date: Feb. 23, 2016, 5 Pages.

Ahmed, et al. "Compiling Imperfectly-nested Sparse Matrix Codes with Dependences", In Proceedings of the Technical Report of TR2000-1788, Mar. 2000, 10 Pages.

Goharian, et al. "Comparative Analysis of Sparse Matrix Algorithms for Information Retrieval", Retrieved from: <<http://citeseerx.ist.psu.edu/viewdoc/download?doi=10.1.1.14.8914&rep=rep1&type=pdf>>, Mar. 4, 2014, 9 Pages.

Kiely, Don "Efficient Data Management in SQL Server 2008, Part 1", Retrieved from: <<http://sqlmag.com/sql-server-2008/efficient-data-management-sql-server-2008-part-1>>, Mar. 24, 2010, 5 Pages.

Saad, Yousef "Iterative Methods for Sparse Linear Systems", In Proceedings of the Third SIAM International Conference on Data Mining, May 1, 2003, 567 Pages.

Thompson, Clay M. "Understanding Sparse Matrix Storage", Retrieved from <<http://www.mathengineering.com/understanding-sparse-matrix-storage>>, Nov. 28, 2012, 2 Pages.

Aspnas, et al., "Efficient Assembly of Sparse Matrices Using Flashing", In Proceedings of the 8th international conference on Applied parallel computing: state of the art in scientific computing, Jun. 18, 2006, pp. 900-907.

Davis, et al., "Row Modifications of a Sparse Cholesky Factorization", In Journal on Matrix Analysis and Applications. Mar. 1, 2005, pp. 621-639.

|   | C₁     | C₂   | C₃             | C₄          |
|---|--------|------|----------------|-------------|
|   | MSG ID | Size | Has Attachment | Has Viagra  |
| 1 | 1      | 20K  | ∅              | ∅           |
| 2 | 2      | 10K  | ∅              | ∅           |
| 3 | 3      | 100K | 1              | 1           |
| 4 | 4      | 25K  | ∅              | ∅           |
| 5 | 5      | 32K  | ∅              | ∅           |

SPARSE DATATABLE DATA STRUCTURE

CROSS-REFERENCE TO RELATED APPLICATIONS

This application is a Continuation of U.S. patent application Ser. No. 14/270,185 filed on May 5, 2014, entitled "Sparse Datatable Data Structure," which issued as U.S. Pat. No. 9,372,877 on Jun. 21, 2016, and which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc. Computing systems can be used to store and manage large datasets.

Large datasets in real-world machine learning applications, and some other applications, typically tend to be extremely sparse, i.e., they have a large fraction of "null" or "zero" (or otherwise identical) elements. Special data structures and algorithms are therefore used to efficiently store and operate on such datasets. For example, the datasets may be run length encoded where a pointer in a vector can identify the start of a run and magnitude of the vector can identify how many nulls or zeros there are. However, these space efficient data structures tend to make several tradeoffs in terms of functionality or performance based on the application. For example, some representations allow sparse data to be efficiently accessed by columns but not by rows. Others allow for efficient insertion but not retrieval, etc. As a consequence a sparse data representation that is well-suited for one application might be completely inappropriate for another. This makes selecting a suitable storage for sparse data very difficult for a novice user.

A common application for sparse data involves sequentially accessing it by rows or by columns depending on the application. Existing state of the art implementations allow data to be efficiently accessed only along one of its axes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for creating a representation of a data table having one or more sparse columns. The method includes creating a sparse dataset structure by creating a column vector for each column in a dataset that has at least one significant value. Each column vector includes data values for columns of the dataset. The sparse data structure includes one or more sparse column vectors for sparse columns in the dataset. For each column vector that is a sparse column vector, the column vector includes a look-up index array and a value array. Entries in the look-up index array represent columns in the dataset. Each entry in the value array includes a value for a row in a column in the dataset. Each entry in the value array corresponds to a row entry in the look-up index array. The method further includes creating a side structure. The side structure includes a row index and a column index. The row index includes a location for each row in the dataset, wherein a given location can have an entry, for a given row, to point to a location in the column index that has an entry that identifies a column that has a first significant entry for the given row. The column index includes an entry for each significant entry in the sparse dataset organized by rows.

Another embodiment illustrated herein is directed to a similar method, but where sparse rows are used instead of sparse columns.

Yet another embodiment illustrated herein is directed to a method of retrieving rows in a sparse dataset represented by sparse column vectors.

Similarly, another embodiment illustrated herein is directed to a method of retrieving columns in a sparse dataset represented by sparse row vectors.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figures 1, 2:
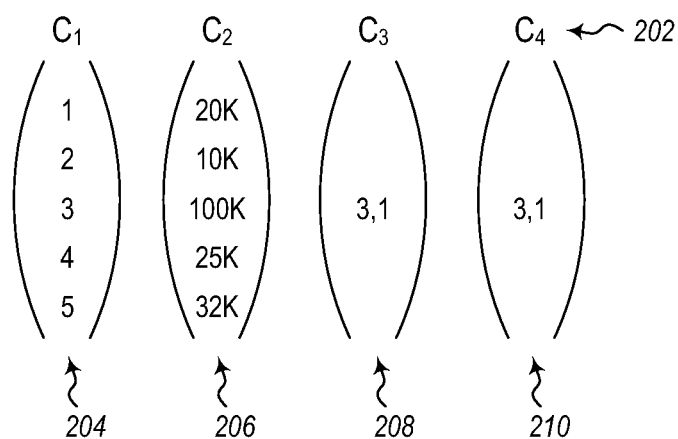
FIG. 1 illustrates a sparse dataset represented as a table.
FIG. 2 illustrates a sparse dataset by using dense and sparse column vectors in a sparse dataset structure.

Embodiments herein are directed to implementing a new data structure that may allow for efficiently iterating over both the rows or columns of a sparse data set with equal asymptotic performance characteristics at the expense of storing a partially redundant representation of a significant (e.g. non-zero or non-null) pattern. Embodiments may implement and/or use a sparse table of values which can be indexed by row or by column. The table only stores significant (e.g. non-zero or non-null) values for sparse columns (or rows) and maintains, and/or creates on demand, a side structure which allows for efficient lookup into the table in the other dimension. Thus, for example, if the table is based on columns, then the side structure allows for efficient row look-up. Embodiments can efficiently access elements in the table either by row or by column. Asking for a sparse row of the table is as efficient, or nearly as efficient as asking for a sparse column, and the efficiency of accessing elements within the row or column is also at or nearly the same. Other systems present a tradeoff in row or column lookup, whereas embodiments herein provide efficiency in either case.

In the following example, sparse column representations are illustrated, but it should be appreciated that in other examples, sparse row representations may alternatively be used.

A sparse dataset table includes a set of sparse vector objects, each of which represents a column of the sparse dataset table. The sparse dataset table may potentially include a set of dense vector objects. A sparse vector contains two fields, the significant array, and the indices array. The significant array contains all of the significant (e.g. non-zero or non-null) elements of the vector. The indices array contains the indices (i.e. row identifiers) of each of those significant elements. When a sparse vector is indexed into, the row index is looked up in the indices array. The indices array can be sorted to allow this lookup to complete in $O(\log(n))$. The position in the index array is then used to index into the significant element array. If the row index is not present in the indices array, zero or null (or other appropriate value in the case of a different high percentage value) is returned.

Additionally, a side structure is implemented. Embodiments keep a representation of the significant (e.g. non-zero or non-null) entries in the matrix, sorted by rows. Therefore, looking up the set of significant columns in each row is as efficient (or nearly as efficient) as looking up the set of significant (e.g. non-zero or non-null) rows in each column, etc.

The side structure can be optimized by not including data values, but rather can include appropriate pointers to data values. Thus embodiments may only store symbolic information such that the actual data values are not duplicated so that the representation is still asymptotically O(NNZ).

A consumer of the sparse data table can retrieve a row or column of the table. If a column is requested, the sparse vector representing the column is simply returned. If a row is requested, a SparseRow object is returned from the side structure. The SparseRow object contains a field denoting the index of the row, and a pointer to the data table it is linked to. When the SparseRow is indexed into, the SparseRow object retrieves the SparseVector from the data table it is linked to that corresponds to the index. It then uses its row field to index into the SparseVector and return the element. The SparseRow can also be iterated over, retrieving only the significant (e.g. non-zero or non-null) values in the row.

Thus, requesting a column from the table returns a sparse vector, whereas requesting a row, in some embodiments, returns an abstract representation of a row. The row representation has the ability to access any of the sparse columns from the table. The row appears to the user as if it were simply a list of values, where in reality no values are stored in the row object itself, and any lookup of a value is implemented by referencing the corresponding table.

More detailed and specific examples are now illustrated. FIG. 1 illustrates an example of a dataset table 102 that one might expect to experience in a machine learning environment. In particular, the table 102 is a small example of a table used for collecting information to detect spam emails. The table 102 includes four columns C1 through C4. C1 stores a set of message identifiers identifying specific emails, C2 stores sizes of mails, C3, stores an indication of whether or not a message has an attachment, and C4 stores an indication of whether or not a message has a particular word. In this example, C4 stores an indication of whether or not a message includes the term "Viagra".

In the particular example, the table 102 includes five rows and four columns. As can be observed columns C3 and C4 are each sparse columns in that they have a large number of rows that have zero or null values (or some other high percentage value) in them. Columns C1 and C2 are dense columns in that they have significant entries for every row of the column. Note that in some embodiments, a threshold value can be created to determine when a column is dense or sparse. For example, one may not wish to treat a column as a sparse column if there is not a significant number of zero or null values. Similarly, one may not wish to treat a column as a dense column due to the presence of a few null or zero value row entries. Various decision making processes and threshold determinations will be illustrated in more detail below.

Figure 3:
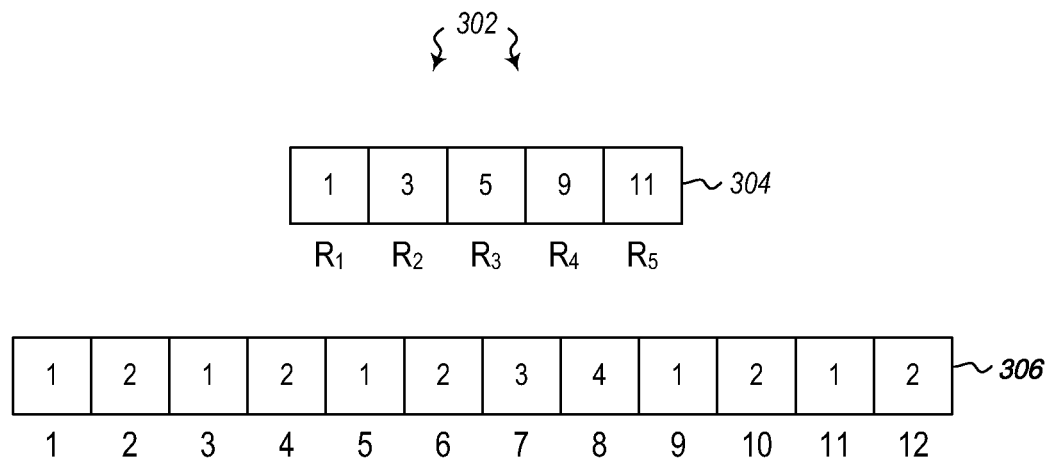
FIG. 3 illustrates a side structure used for row retrieval from the sparse dataset structure.

Returning once again to the instant example, FIG. 2 illustrates a sparse table 202, while FIG. 3 illustrates the side structure 302. The sparse table includes two dense vector objects 204 and 206 representing the dense columns C1 and C2 of table 102 respectively and two sparse vector objects 208 and 210 representing the sparse columns C3 and C4 of the table 102 respectively. Illustratively, the sparse vector object 208 includes a significant array and an indices array. In this particular example, each of these arrays only includes a single value. In particular, the significant array includes the value "1" indicating "true" and the indices array includes the value "3" indicating that row 3 of the dataset 102 includes the data value. A similar analysis can be undertaken for the sparse vector object 210. Other sparse vector objects may include more than one entry.

The side structure 302 includes a row index 304 and a column index 306. The row index 304 is allocated such that it includes a location for each row in the table 102. It may not have an entry (or may have a zero or null entry) in the location when all columns in the table are sparse columns, but the location is nonetheless allocated. In the particular example, because there is one or more dense columns (i.e. column vectors 204 and 206), there is an entry in every location in the row index 304.

The column index 306 includes an entry for each significant (e.g. non-zero, non-null or in some cases, non-high percentage) entry in the table 102. The row index 304 includes an entry in a location when there is significant data in the row represented by the location. The entry in the row index 304 points to a location in the column index 306 for a first appearing data entry in the table 102 for a row. The column index entries identify which column a significant data entry is located.

Thus, for example, for row 3 of the table 102, an entry appears at $R_3$ of the row index 304. This entry points to the fifth location in the column index 306, which is the first entry for a value in row 3. At the fifth location in the column index 306 is the number 1, indicating that there is a significant data value in the first column of row 3. Notice that the entries at the sixth, seventh and eighth locations of the column index 306 also include pointers to columns for row 3 which indicate that there are significant data values in the second, third and food columns of row 3 respectively. Note that in contrast, for row 4 of the table 102, there are only entries at the ninth and tenth locations of the column index 306 indicating that there are only significant entries in the first and second columns of row 4 of the table 102.

Thus, if a system wanted to get a row, the system could reference the row index 304 at the location for the row. If a zero, null or other appropriate indicator were there indicating that there was no data in the row, then a zero, null or other appropriate indication could be returned to the system indicating that there is no data in the row. However, if the location for the row in the row index 304 pointed to a location in the column index 306, then all of the entries in the column index 306 for that row could be returned. This could be done by using information from the row index to determine where the entries for the row end. For example, the next non-zero or non-null entry in the row index 304 points to the start of the next set of data for a subsequent row. Thus, all of the entries in the column index from the location pointed to by the row index 304 up to, but not including the next location pointed to in the row index 304 could be returned.

The actual data could then be obtained by reference to the sparse table 202. In particular, the returned values indicate which column contains the data. A Boolean search on the row value could be done in a particular column to obtain the data value. Thus, for example, if it is known from the data returned from the column index 306 that column 4 has significant data at row 3, then a Boolean search could be performed on the sparse vector $C_4$ 210 for row 3 to obtain the data value "1".

The following comparison of column-wise lookup and row-wise lookup demonstrates the efficiency of both operations in a more generic fashion.

In this example, the user wishes to access the element stored at row X, column Y of a sparse data table.

The act of performing a lookup by column may perform the following operations:
1. Retrieve column Y from the table. This is an O(1) lookup into the list of columns
2. Lookup index X in column Y's index list. Because the list is sorted, the lookup is performed in O(log(n))
3. If the index is not present, zero is returned.
4. If the index is present, use the index to lookup the value in column Y's value list. This is an O(1) operation.

The act of lookup by row may be performed using the following operations:
1. Retrieve row X from the table. This returns an object which contains a reference to the table, and the row index (X). This object can be treated by the user as if it were an indexable row object, although underneath it contains no values itself. This is a constant time operation because it only requires setting the proper references.
2. Repeat steps 1 through 4 from the previous column-wise example on the table referenced in the row object.

These two examples demonstrate that indexing by row or by column is essentially equally efficient, because both ultimately perform a look up of the corresponding value in the sparse vector representing the column.

As noted previously, embodiments may be implemented where the table only stores symbolic references to data, rather than actual values. Storing only references avoids the duplication of values in the table, meaning that the actual size of the table is on the order of O(NNZ), but with a larger constant, (number of significant (e.g. non-zero or non-null) values).

The table supports indexing using the table [i][j] notation, using the i value to retrieve the proper column, and the j value to index into it. This notation provides the same experience to the user as working with a dense matrix.

The following illustrates a generic model for sparse datasets with efficient row and column access. First, background and notation will be introduced.

Let A be a sparse dataset with M rows, N columns and NNZ significant (e.g. non-zero or non-null) values. It is assumed that the following inequality holds:

$$N \leq M < NNZ << M \times N$$

It is further assumed that the A is stored as a collection of N column vectors with M rows each and that each such column vector is in turn homogeneous (i.e., each element i in column j is of the same element type, $T_j$). However embodiments may permit each row to be heterogeneous, i.e. for two columns $j_1$ and $j_2$, $T_{j_1} \neq T_{j_2}$ for $j_1 \neq j_2$ Let A[i,:] and A[:,j] respectively denote the $i^{th}$ row and $j^{th}$ column of A. Each column is also associated with an identifier L[j] and the expression A[L[j]] is defined as A[:,j].

Let ColIdx[j] denote the indices corresponding to the significant (e.g. non-zero or non-null) rows in A[:,j] and RowIdx[i] denote the indices corresponding to the significant (e.g. non-zero or non-null) columns in A[i,:]. Note that the storage for RowIdx[i] or ColIdx[j] only corresponds to the indices themselves, not the actual values.

Finally, let Val[j] be the actual significant values in A[:,j]. The element in the $i^{th}$ row and $j^{th}$ column of A denoted as A[i,j] can be written as:

$$A[i, j] = \begin{cases} Val[k] & \text{if } \exists k \text{ s.t. } i = ColIdx[j][k] \\ 0 & \text{otherwise} \end{cases}$$

Figure 4:
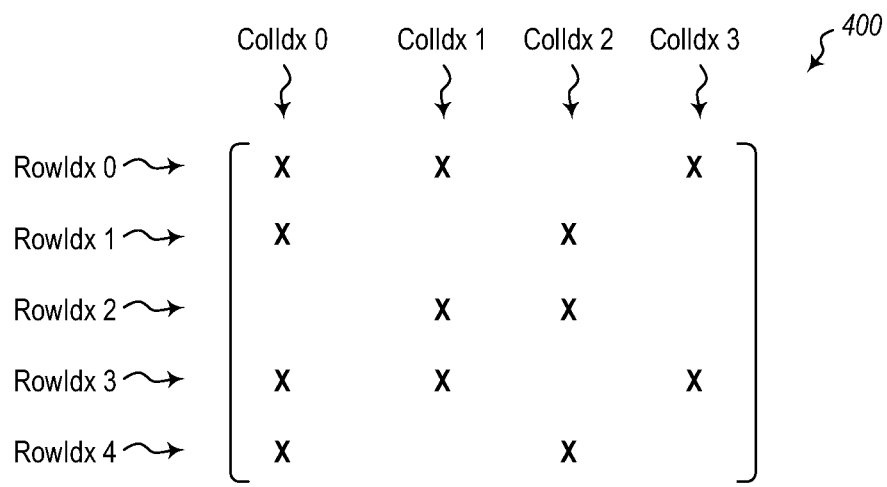
FIG. 4 illustrates a generic example of a sparse dataset.

FIG. 4 illustrates a sparse matrix 400 with M=5, N=4, NNZ=12. RowIdx[0]={0,1,3}, RowIdx[1]={0,2}, ColIdx[0]={0,1,3,4}, ColIdx[1]={0,2,3} etc.

The dataset A supports the following main operations:
1. Element reference, v=A[i,j]: returns the element at row i and column j as an "object".
2. Element assignment, A[i,j]=v: sets the element at row i and column j to element v. It is an error if v is not of type $T_j$.
3. Column reference, b=A[j] or b=A[l]: returns a dense or sparse M—element vector of type $T_j$ corresponding to column j or to an identifier l.
4. Column assignment, A[j]=b or A[l]=b: sets the column at index j or identifier l to a N—element vector b.
5. Row reference, c=A.GetRow(i): gets a N-element vector c corresponding to row i.
6. Row assignment, A.SetRow(i,c): sets the $i^{th}$ row of A to a N—element vector c. Element j of c must be of type $T_j$.
7. Column concatenation, A.AppendColumn(b): appends a dense or sparse column b of length M to the dataset. The resulting dataset has N+1 columns.
8. Row concatenation, A.AppendRow(c): appends a dense or sparse row with N elements to the dataset. The resulting dataset has M+1 rows.

9. Column iterator, A.Columns: returns an iterator over the columns of A. The resulting iterator provides two methods:
    a. CurrentValue that returns the current column being iterated over
    b. MoveNext that advances the iterator to the next column and returns True if there are more columns to iterate over and False otherwise.
10. Row iterator, A.Rows: returns an iterator over the rows of A. The resulting iterator provides two methods:
    a. CurrentValue that returns the current row being iterated over
    b. MoveNext that advances the iterator to the next row and returns True if there are more rows to iterate over and False otherwise.

The following pseudo code illustrates implementations of the row and column iterators, A.Rows and A.Columns using the row and column reference operations, A.GetRow and A.GetColumn respectively. Notably, the pseudo code is implemented in Python, however similar methods may be used with other implementations.

```
class RowIterator:
    def __init__(self, dataset):
        self.dataset = dataset; self.index = -1
    def MoveNext(self):
        self.index += 1
        return self.index < self.dataset.NumRows( )
    def CurrentValue(self):
        return self.dataset.GetRow[self.index]
class ColumnIterator:
    def __init__(self, dataset):
        self.dataset = dataset; self.index = -1
    def MoveNext (self):
        self.index += 1
        return self.index < self.dataset.NumColumns( )
    def CurrentValue(self):
        return self.dataset.GetColumn[self.index]
```

The following now illustrates implementing sparse row and column iterations. Although the dataset supports a large number of operations described above, the two most used operation in a machine learning context are row and column iterations.

In particular, column-wise operations are typically performed for pre-processing the data before it is passed to other workflows. For example, it is very common to normalize columns of a dataset so they all have the same mean and standard deviation or the same range of values. Column-wise operations are also used to convert all elements of type $T_j$ to type $T'_j$ (say integer to floating-point, or string to categorical, etc.). Therefore, it is desirable for the dataset to provide very efficient access to its individual columns.

Once the data has been pre-processed and normalized, it is in turn often desirable to iterate over its rows in order to compute the weights in a machine learning model, or, given the weights, compute the desired value of the target variable. It is therefore desirable for the dataset to provide very efficient access to its individual rows.

For sparse datasets stored by columns, it is extremely challenging to efficiently iterate over its rows. Similarly, for sparse datasets stored by rows, it is equally challenging to provide an efficient iterator over its columns. For instance, the following illustrates an implementation of A.GetRow for a sparse dataset that is stored by columns:

```
class DataSet:
    def __init__(self, columns):
        self.data = columns;
        self.numrows = len(columns[0])
        self.numcols = len(columns)
    def NumRows (self):
        return self.numrows
    def NumColumns(self):
        return self.numcols
    def GetColumn (self, index):
        return self.data[index]
    def GetRow (self, index):
        rowDict = { }
        for column in range (self.NumColumns( )):
            if self.data[column] [index] != 0:
                rowDict[column] = self.data[column][index]
        return rowDict
```

Since one only has access to individual columns, extracting a given row requires scanning all columns to see if a given element A[i,j] is significant non-zero or non-null). If an element is significant, it is returned along with the corresponding column index.

Clearly, scanning each column for every row is highly inefficient for datasets that contain a large number of zero or null elements (i.e., for extremely sparse data). Iterating row-wise: over the entire dataset requires O(M×N) memory access whereas ideally only O(NNZ) would suffice. Operations that require multiple scans over the entire table (as in the ease of machine learning methods based on gradient minimization) as even more impacted since they require O(k×M×N) memory access as opposed to O(k×NNZ).

To avoid scanning all the columns for every row, one can instead pre-compute the row sparsity structure (i.e. a side structure as discussed above), RowIdx[i] in a very efficient manner with O(NNZ) accesses. This is illustrated as follows:

```
Class RowSparsityStructure:
    def __init__(self, data):
        rowcounts = [0]*data.Numrows( )
        for column in range(data.NumColumns( )):
            for row in column.NonZeroIndices( ):
                rowcounts[row] += 1
        self.rowoffsets = [0]*(data.NumRows( ) + 1)
        for row in range(data.NumRows( )):
            self.rowoffsets[row + 1] =
  self.rowoffsets[row] + rowcounts [row]
        work = list(self.rowoffsets)
        self.columnindices = [0]*self.rowoffsets[-1]
        for column in range(data.NumColumns( )):
            for row in column.NonZeroIndices( ):
                self.columnindices[work[row]] = column
                work[row] += 1
    def NonZeroColumns(self, index):
        return self.columnindices[range(self.rowoffsets[index], \
                                         self.rowoffsets[index + 1])]
```

Then, the significant (e.g. non-zero or non-null) elements in each row can be accessed in O(|RowIdx[i]|) and the resulting complexity of row iteration is then O(Σ|RowIdx[i]|) or O(NNZ). A more efficient implementation of A.GetRow based on the pre-computed values of RowIdx is shown below:

```
class DataSet:
    #
    # Other methods excluded
    #
    def GetRowImproved(self, index):
        if not self.rowsparsity:
            self.rowsparsity = RowSparsityStructure(self)
        rowDict = { }
        for column in self.rowsparsity.NonZeroColumns(index):
```

```
rowDict[column] = self.data[column][index]
return rowDict
```

The following illustrates details regarding maintaining consistency of a row sparsity structure.

The row sparsity structure RowIdx may need to be updated when the dataset is mutated, depending on the mutation, otherwise operations such as A.GetRow or A.Rows will produce incorrect values. In particular, if updates occur to a dense column, there is no need to update the row sparsity structure. Additionally, if there is an update to a sparse column that does not affect the sparsity of the column, that is no non-zero or null elements (in the present example) are changed to zero or null elements and no zero or null elements are changed to non-zero or null elements, then there is no need to update the sparsity structure. Otherwise, the sparsity structure will be updated.

There are essentially two approaches to maintaining consistency of the sparsity structure:
1. Embodiments can keep the structure consistent after each mutation operation, or,
2. After certain mutation operations, we can mark the structure as "dirty". Then, any operation that needs to access it can lazily recreate the structure if needed.

The second option may be preferred in some embodiments under the following situations:
1. The dataset is updated very infrequently relative to the number of times it is iterated upon in a row-wise manner. In this case, the cost of creating/recreating the row sparsity structure can be amortized over multiple iterations.
2. The cost of recreating the structure is low relative to the cost of keeping it up-to-date. Keeping the row structure up to date can be done in O(1) with a potentially large constant whereas creating it from scratch is O(NNZ) with a relatively small constant. Therefore, as NNZ approaches M×N (i.e., as the dataset gets more and more dense), it is less expensive to keep the row structure consistent compared to recreating it from scratch. On the other hand, for NNZ~O(1), recreating the sparsity structure can be done very efficiently, particularly if the cost of creating it can be amortized over multiple iterations.

Since the conditions listed above are generally true for many machine learning datasets in practice, some embodiments are configured to invalidate the sparsity structure under certain mutations and recreate it on demand.

Figure 5:
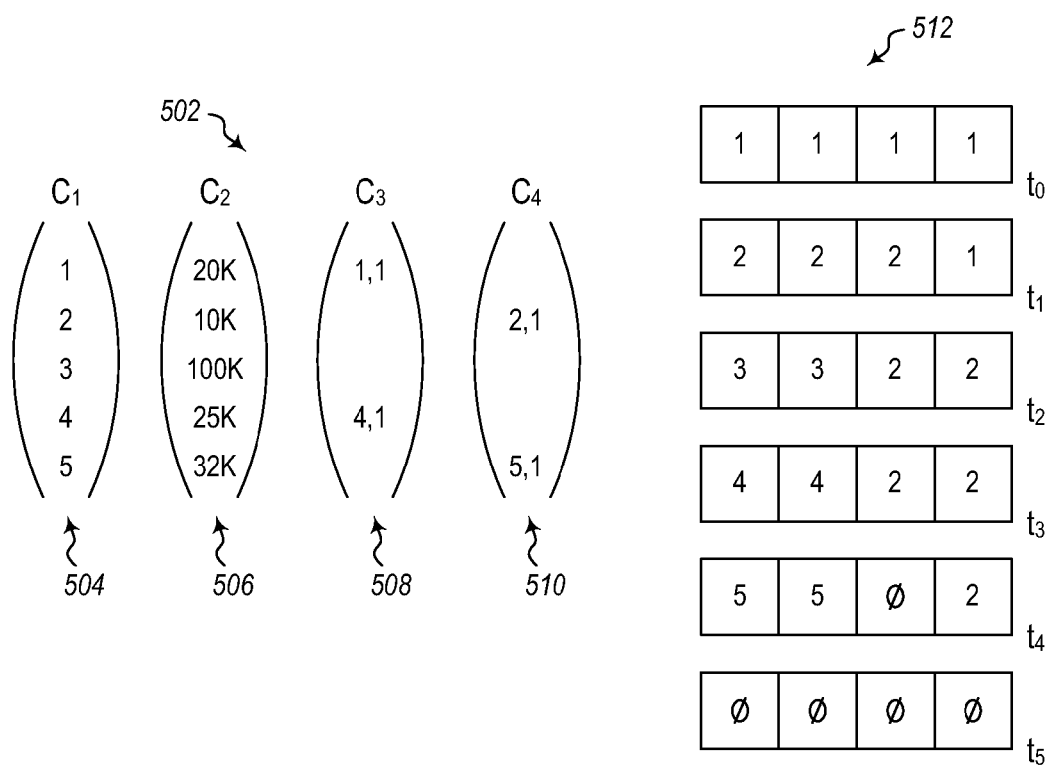
FIG. 5 illustrates a next value pointer table used to accelerate access to data in rows of the dataset.

Note that in many instances, a sparse dataset can be mutated in ways that do not require the sparsity structure to be completely invalidated. For example:
1. Replacing a dense column with another dense column or a sparse column with another sparse column with different significant values (but with the same sparsity structure) does not change the row sparsity structure.
2. Replacing a dense column with a sparse one will still give a valid, albeit inefficient sparsity structure since the row iterator will return (redundant) zero values
3. Finally, when appending rows to a dataset, the sparsity structure can be kept consistent in amortized constant time Some embodiments, if implemented only as described above, may have some slight inefficiencies. For example, in some embodiments, accessing a given row in a particular sparse column is O(|ColIdx[j]|) instead of O(1). Although this inefficiency is rarely noticeable in practice, it is possible to achieve better results, and possibly the optimal lower-bound by additionally storing an iterator over the next significant (e.g. non-zero or non-null) element in each sparse column. This optimization might be desirable for datasets with a large number of significant (e.g. non-zero or non-null) elements. Consider the example illustrated in FIG. 5. FIG. 5 illustrates a sparse table 502, with two dense columns 504 and 506 and two sparse columns 508 and 510. FIG. 5 also illustrates a next value table 512 shown at six different times, $t_0$ through $t_5$. The next value table 512 includes an entry for each column in the sparse table 502. In particular, each next value table entry indicates which entry in a column has the next value. In the example illustrated, the next value table entries are based, per column, on the number of entries in the column. Thus, for column $C_1$ 504, there are five possible entries 1-5 (other than a don't care, null or zero entry). The same is true for column C2 506. For the sparse columns, each of these only has two entries per column, and thus there are only two possible next value entries (other than don't care, null, or zero) 1 or 2.

At time $t_0$, before any data has been read from the sparse table 502, all next value table entries in the next value table 512 are 1 indicating that the next entry, for all of the columns, where a table entry can be found is at the first location in the column. Using the next value table entries, when it is time to locate a value in a column, the next value table entry for that column can be read to determine which entry in a column should be read. Thus, when reading row one, the values 1, 20K and 1 of columns $C_1$, $C_2$ and $C_3$ respectively, can be identified quickly by referencing the next value table entry for quicker lookup into the columns. At time $t_1$, occurring after the first row has been read, the next value table entries are incremented if a value has been read from a corresponding row. Thus, since values were read from row 1 of columns $C_1$, $C_2$ and $C_2$, all three of these next value table entries are incremented by 1. At $t_2$, some time after row 2 has been read, table entries are read for row 2 of columns $C_1$, $C_2$, and $C_4$. The process continues as illustrated in FIG. 5 at time $t_3$ some time after row 3 has been read, at time $t_4$ some time after row 4 has been read, and $t_5$ some time after row 5 has been read. Notably, once all entries have been read for a column, the next value table entry for that column can be changed to some null, zero, or other don't care value.

In the example, illustrated in FIG. 5, an entry is included for each of the columns in the table 502. However, some embodiments may be optimized by only including next value table entries in the next value table for sparse column. Thus, the first two entries in the table 512 could be eliminated.

Thus, embodiments may include creating a next value pointer table, wherein the next value pointer table is configured to, columnwise, have a pointer to a look-up index entry to allow a system to retrieve a corresponding value from the value array without needing to perform a binary search to look-up the value in the value array. The pointer for each column increments each time a value from a value array is obtained for that column.

Figure 6:
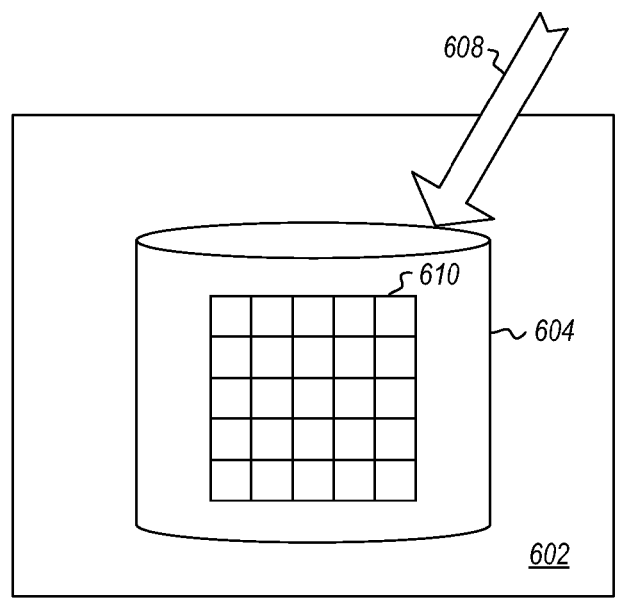
FIG. 6 illustrates a hardware environment using embodiments of the invention.

Referring now to FIG. 6, an example of a hardware environment where embodiments may be implemented is illustrated. FIG. 6 illustrates a computing system 602 that includes a data store 604. The computing system may include various processors, memory, storage, input hardware, etc. In the illustrated example, input 608 is received into the computing system 602. In some embodiments, the input may be input that can be used for machine learning processes. For example, the input may be input received from various sensors, reports from other systems, or form other appropriate sources. The input can be formatted and stored a dataset 610 in the data store 604. The dataset 610 may be a sparse dataset that can be operated on in the fashion described previously herein.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
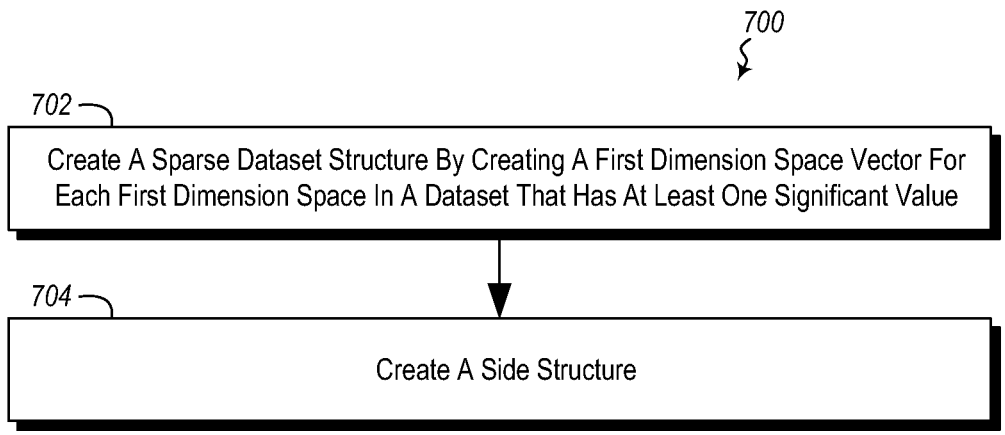
FIG. 7 illustrates a method of building a sparse data structure.

Referring now to FIG. 7, a method 700 is illustrated. The method 700 may be practiced in a computing environment. The method 700 includes acts for creating a representation of a data table having one or more sparse first dimension spaces. The data table, as used herein may be a heterogeneous data table. For example, the data table may have a column of strings and a column of dates in the same table. Note that the method 700 can be performed for a data table having sparse columns, or a similar method could be performed for a data table have sparse rows. In that case, any method acts performed on columns would be performed on rows and any method acts performed on rows would be performed on columns.

The method 700 includes creating a sparse dataset structure by creating a first dimension space vector for each first dimension space in a dataset that has at least one significant (e.g. non-zero or non-null) value (act 702). Each first dimension space vector includes data values for second dimension spaces of the dataset having data values for a given first dimension space of the dataset. The sparse data structure includes one or more sparse first dimension space vectors for sparse first dimension spaces in the dataset.

For each first dimension space vector that is a sparse first dimension space vector, the first dimension space vector includes a look-up index array and a value array. Entries in the look-up index array represent second dimension spaces in the dataset. Each entry in the value array comprises a value for a second dimension space in a first dimension space in the dataset corresponding to a first dimension space vector. Each entry in the value array corresponds to a representation of a second dimension space entry in the look-up index array. Example of such sparse column vectors are illustrated above in FIG. 2 at 208 and 210.

The method 700 further includes creating a side structure (act 704). The side structure includes a second dimension space index and a first dimension space index. For example, FIG. 3 illustrates a side structure 302 that has been created. The side structure 302 includes a row index 304 and a column index 306. The second dimension space index includes a location for an entry for each second dimension space in the dataset to allow the entry to point to a location in the first dimension space index. For example, the row index 304 includes five locations R1-R5, one for each of the rows in the sparse table 202. Further embodiments allows the entry, for a given second dimension space, to point to a location in the first dimension space index that has an entry that identifies a first dimension space that has a first significant entry for the given second dimension space. Thus for example, the entry at location R2 points to column index location 3, which includes an entry that indicates that the first significant entry in for row 2 is in column 1 ($C_1$). The first dimension space index includes an entry for each significant entry in the sparse dataset organized by second dimension spaces. Thus, for example, entries for row 1 are in locations 1 and 2 of the column index 306, entries for row 2 are in locations 3 and 4 of the column index 306, entries for row 3 are in locations 5 through 8 of the column index 306, entries for row 4 are in locations 9 and 10 of the column index 306, and entries for row 5 are in locations 11 and 12 of the column index 306.

The method 700 may be practiced where for first dimension space vectors for dense first dimension spaces in the dataset vectors have value arrays and exclude the look-up index array. For example, the dense columns 204 and 206 do not include the look-up index array as illustrated in the sparse columns 208 and 210.

The method 700 may further include comprising determining that data in a dense first dimension space of the dataset has been updated, and as a result, determining to not update the side data structure. In particular, if only data in a dense first dimension space is updated, there is no need to update the side data structure because it should remain the same.

In contrast, however, the method 700 may alternatively include determining that an update has been performed to a sparse first dimension space that causes a change in the sparsity of the data in the sparse first dimension space. As a result, the method may include determining that the side data structure should be updated. For example, any changes made to the dataset that change zero or nulls in the dataset (either by changing entries to zero or null or changing entries from zero or null) will result in a need to update the side data structure. However, this update may be done lazily meaning that is can be delayed and only performed the next time there is a need to access the data structure. This is possible because of the relative ease in which the side data structure may be constructed.

In contrast, the method 700 may further include comprising determining that an update has been performed to a sparse first dimension space that does not cause a change in the sparsity of the data in the sparse first dimension space, and as a result, determining that the side data structure does not need to be updated. Thus, for example, if significant entries are changed, but they are not changed to null or zero, and none of the nulls or zeros are changed from null or zero, then there is no need to update the side data structure.

The method 700 may further include evaluating one or more first dimension spaces in the data structure to determine if the one or more first dimension spaces are sparse first dimension spaces or dense first dimension spaces based on the first dimension spaces having a threshold of significant (e.g. non-zero or non-null) entries. In some embodiments, the threshold may be configurable such that a user can determine when a first dimension space is classified as a dense or sparse first dimension space. Thus, for example, while a column may have a number of zero or null entries, there may be a desire to treat the column as a dense column. Some embodiments may allow this to be configurable. Thus, for example, a column may be a sparse column if it has at least 50% of the row entries in the column that are null or zero. An administrator may change the threshold to 40%, 60% or some other appropriate percentage.

The method 700 may further include creating a next value pointer table. The next value pointer table is configured to, first dimension spacewise, have a pointer to a look-up index entry to allow a system to retrieve a corresponding value from the value array without needing to perform a binary search to look-up the value in the value array. The pointer for each first dimension space increments each time a value from a value array is obtained for that first dimension space.

Thus, for example, a next value pointer table such as the next value pointer table 502 illustrated in FIG. 5 may be implemented.

The method of FIG. 7 may be implemented in some embodiments where a first dimension space is a column and a second dimension space is a row. Alternatively, the method of FIG. 7 may be implemented where a first dimension space is a row and a second dimension space is a column. For example, in contrast to the examples above, sparse row vectors are used instead of sparse column vectors. In this case, the sparse row vectors have a look-up index array that indexes columns instead of rows. Additionally, the side structure has a column index and a row index. In further contrast to previous examples, the column index has a location for an entry for each column in the dataset to allow the entry, for a given column, to point to a location in the row index that has an entry that identifies a row that has a first significant entry for the given column. The row index includes an entry for each significant entry in the sparse dataset organized by columns.

Figure 8:
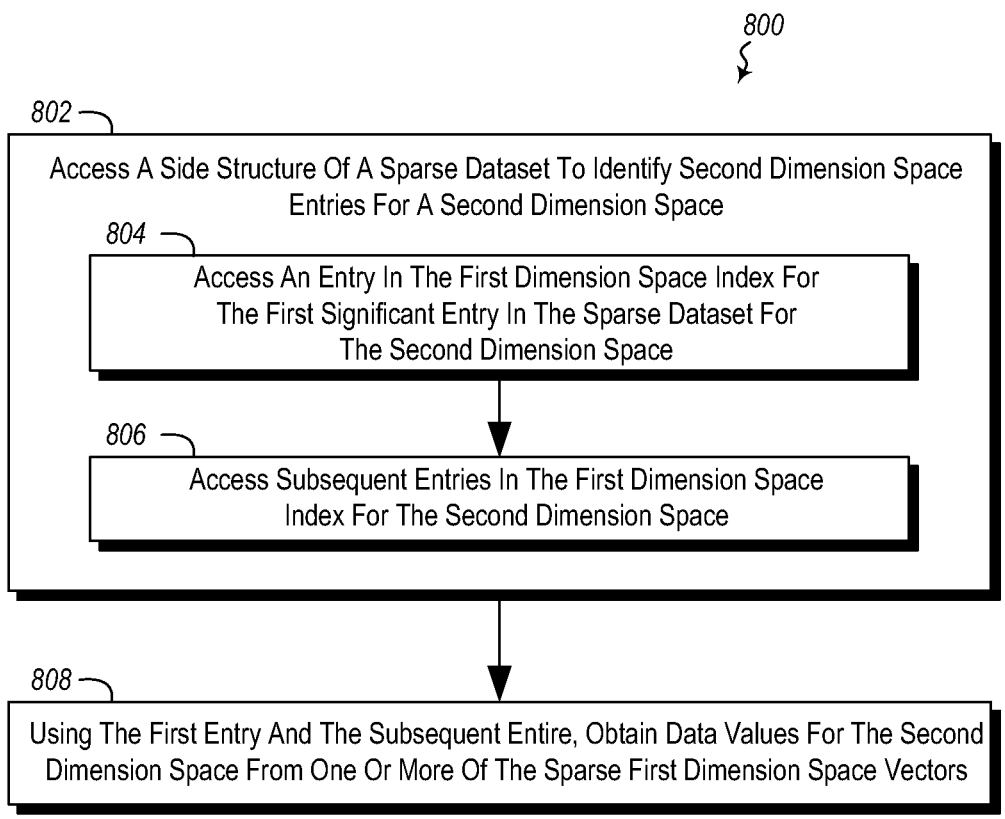
FIG. 8 illustrates a method of accessing rows in a sparse data structure.

Referring now to FIG. 8, a method 800 is illustrated. The method 800 may be practiced in a computing environment and includes acts for retrieving a second dimension space from a sparse dataset structure. The method includes accessing a side structure of a sparse dataset to identity second dimension space entries for a second dimension space (act 802). The sparse dataset may be one using sparse column vectors as illustrated above. However, similar embodiments may be implemented using sparse row vectors instead.

Accessing the side structure (act 802) includes accessing an entry in the first dimension space index for the first significant entry in the sparse dataset for the second dimension space (804) and accessing subsequent entries in the first dimension space index for the second dimension space (act 806).

The method 800 further includes using the first entry and the subsequent entries, obtaining data values for the second dimension space from one or more of the sparse first dimension space vectors (act 808). This may be performed, for example, where accessing an entry in the first dimension space index for the first significant entry in the sparse dataset for the second dimension space and accessing subsequent entries in the first dimension space index for the second dimension space comprises accessing a set of adjacent entries in the first dimension space index. For example, as shown in FIG. 3, all of the entries for row 3 could be identified by accessing entries 5 through 8 of the column index 306.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks.

In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a system capable of substantially equally efficient look-up in both a first and second dimension space of a sparse dataset structure, even when the sparse dataset structure has been organized and stored for efficient access in the first dimension space but not in the second dimension space, thus creating a more efficient system for accessing data in the second dimension space than previous systems, wherein the sparse dataset structure comprises a first dimension space vector for each first dimension space in a dataset that has at least one significant value, each first dimension space vector comprising data values for first dimension spaces of the dataset, the sparse data structure comprising one or more sparse first dimension space vectors for sparse first dimension spaces in the dataset, and wherein for each first dimension space vector that is a sparse first dimension space vector, the first dimension space vector includes: a look-up index array where entries in the look-up index array represent second dimension spaces in the dataset; and a value array where each entry in the value array comprises a value of an entry of a second dimension space in the first dimension space vector, and wherein each entry in the value array corresponds to a second dimension space entry in the look-up index array, the system comprising:
   one or more processors;
   one or more computer readable media coupled to the one or more processors;
   a side structure implemented in the one or more computer readable media, wherein the side structure comprises:
      a first dimension space index; and
      a second dimension space index, wherein the second dimension space index comprises a location for each second dimension space in the dataset where a location can have an entry for a corresponding second dimension space and where an entry for a given second dimension space points to a location in the first dimension space index that has an entry that identifies a first dimension space that has a first significant entry for the given second dimension space; and
      wherein the first dimension space index comprises an entry for each significant entry in the sparse dataset organized by second dimension spaces.

2. The system of claim 1, wherein each first dimension space is a row and each second dimension space is a column.

3. The system of claim 1, wherein each first dimension space is a column and each second dimension space is a row.

4. The system of claim 1, wherein for first dimension space vectors for dense first dimension spaces in the dataset vectors have value arrays and exclude the look-up index array.

5. The system of claim 1, wherein the system is configured to update the side data structure.

6. The system of claim 5, wherein the system is configured to update the side data structure as a result of determining that an update has been performed to a sparse first dimension space that causes a change in the sparsity of the data in the sparse first dimension space.

7. The system of claim 1 further comprising, a next value pointer table, wherein the next value pointer table has, first dimension spacewise, a pointer to a look-up index entry to allow the system to retrieve a corresponding value from the value array without needing to perform a binary search to look-up the value in the value array, and wherein the pointer for each first dimension space is configured to increment each time a value from a value array is obtained for that first dimension space.

8. In a computing environment, a system capable of substantially equally efficient look-up in both a first and second dimension space of a sparse dataset structure, even when the sparse dataset structure has been organized and stored for efficient access in the first dimension space but not in the second dimension space, thus creating a more efficient system for accessing data in the second dimension space than previous systems, the system comprising:
   one or more processors;
   one or more computer readable media comprising computer executable instructions that when executed by one or more processors causes the following to be performed:
      accessing a side structure of a sparse dataset to identify second dimension space entries for a second dimension space, wherein the sparse dataset comprises a first dimension space vector for each first dimension space in a dataset that has at least one significant value, each first dimension space vector comprising data values for first dimension spaces of the dataset, the sparse data structure comprising one or more sparse first dimension space vectors for sparse first dimension spaces in the dataset, and wherein for each first dimension space vector that is a sparse first dimension space vector, the first dimension space vector includes:
         a look-up index array where entries in the look-up index array represent second dimension spaces in the dataset; and
         a value array where each entry in the value array comprises a value of an entry of a second dimension space in the first dimension space vector, and wherein each entry in the value array corresponds to a second dimension space entry in the look-up index array.

9. The system of claim 8, wherein the side structure comprises a second dimension space index and a first dimension space index, wherein the second dimension space index comprises a location for each second dimension space in the dataset where a location can have an entry for a corresponding second dimension space and where an entry for a given second dimension space points to a location in the first dimension space index that has an entry that identifies a first dimension space that has a first significant entry for the given second dimension space, and wherein the first dimension space index comprises an entry for each significant entry in the sparse dataset organized by second dimension spaces; and wherein accessing the side structure comprises:

accessing an entry in the first dimension space index for the first significant entry in the sparse dataset for the second dimension space; and accessing subsequent entries in the first dimension space index for the second dimension space.

10. The system of claim 9, wherein the one or more computer readable media comprising computer executable instructions that when executed by one or more processors causes the system to use the first entry and the subsequent entries, to obtain data values for the second dimension space from one or more of the sparse first dimension space vectors.

11. The system of claim 9, wherein accessing an entry in the first dimension space index for the first significant entry in the sparse dataset for the second dimension space and accessing subsequent entries in the first dimension space index for the second dimension space comprises accessing a set of adjacent entries in the first dimension space index.

12. The system of claim 8, wherein obtaining data values for the second dimension space from one or more of the sparse first dimension space vectors comprises accessing a next value pointer table, wherein the next value pointer table is configured to, first dimension spacewise, have a pointer to a look-up index entry to allow a system to retrieve a corresponding value from the value array without needing to perform a binary search to look-up the value in the value array, and wherein the pointer for each first dimension space increments each time a value from a value array is obtained for that first dimension space.

13. The system of claim 8, wherein the sparse dataset stores machine learning data.

14. The system of claim 8 the one or more computer readable media further comprising computer executable instructions that when executed by one or more processors causes the following to be performed: obtaining a sparse first dimension space in the sparse dataset by obtaining a sparse first dimension space vector.

15. The system of claim 8, wherein each first dimension space is a row and each second dimension space is a column.

16. The system of claim 8, wherein each first dimension space is a column and each second dimension space is a row.

17. In a computing environment, a system capable of substantially equally efficient look-up in both a first and second dimension space of a sparse dataset structure, even when the sparse dataset structure has been organized and stored for efficient access in the first dimension space but not in the second dimension space, thus creating a more efficient system for accessing data in the second dimension space than previous systems, wherein the sparse dataset structure comprises a first dimension space vector for each first dimension space in a dataset that has at least one significant value, each first dimension space vector comprising data values for first dimension spaces of the dataset, the sparse data structure comprising one or more sparse first dimension space vectors for sparse first dimension spaces in the dataset, and wherein for each first dimension space vector that is a sparse first dimension space vector, the first dimension space vector includes: a look-up index array where entries in the look-up index array represent second dimension spaces in the dataset; and a value array where each entry in the value array comprises a value of an entry of a second dimension space in the first dimension space vector, and wherein each entry in the value array corresponds to a second dimension space entry in the look-up index array, the system comprising:

one or more processors;

one or more computer readable media comprising computer executable instructions that when executed by one or more processors causes the following to be performed:

creating a side structure, wherein the side structure comprises a second dimension space index and a first dimension space index, wherein the second dimension space index comprises a location for each second dimension space in the dataset where a location can have an entry for a corresponding second dimension space and where an entry for a given second dimension space points to a location in the first dimension space index that has an entry that identifies a first dimension space that has a first significant entry for the given second dimension space, and wherein the first dimension space index comprises an entry for each significant entry in the sparse dataset organized by second dimension spaces.

18. The system of claim 17, the one or more computer readable media further comprising computer executable instructions that when executed by one or more processors causes the system to determine that data in a dense first dimension space of the dataset has been updated, and as a result, determine to not update the side data structure.

19. The system of claim 17, the one or more computer readable media further comprising computer executable instructions that when executed by one or more processors causes the system to determine that an update has been performed to a sparse first dimension space that causes a change in the sparsity of the data in the sparse first dimension space, and as a result, determine that the side data structure should be updated.

20. The system of claim 17, the one or more computer readable media further comprising computer executable instructions that when executed by one or more processors causes the system to determine that an update has been performed to a sparse first dimension space that does not cause a change in the sparsity of the data in the sparse first dimension space, and as a result, determine that the side data structure does not need to be updated.

* * * * *